Aug. 19, 1941.          U. R. FURST          2,253,174
                    MEASURING INSTRUMENT
                     Filed Jan. 13, 1940
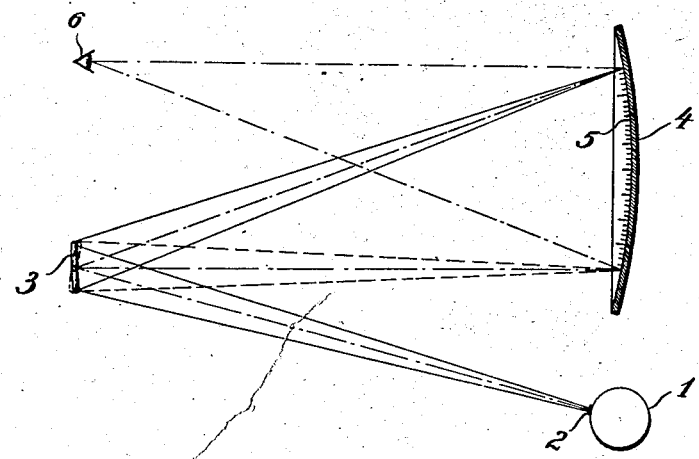
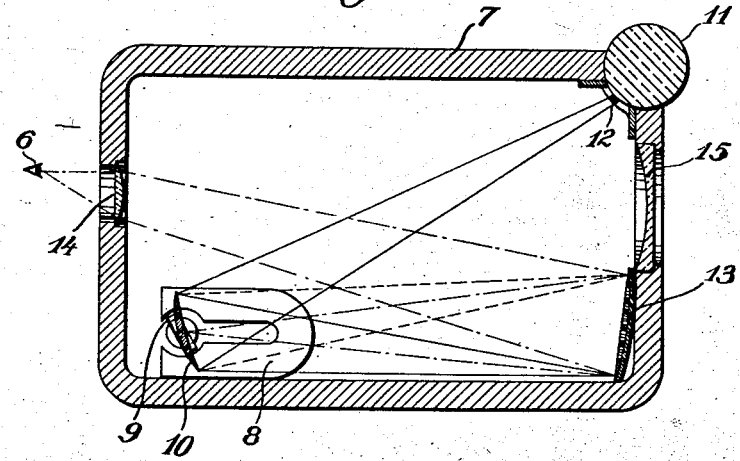
INVENTOR:
Ulrich R. Furst
BY
AGENT.

Patented Aug. 19, 1941

2,253,174

UNITED STATES PATENT OFFICE 2,253,174

MEASURING INSTRUMENT

Ulrich R. Furst, Brookline, Mass.

Application January 13, 1940, Serial No. 313,766

16 Claims. (Cl. 88—23)

My invention relates to measuring instruments comprising a movable indicating element.

It especially relates to measuring instruments in which this movable indicating element is connected with a mirror or the like, and a light beam is deflected by this mirror.

It is the main object of my present invention to attain also a clear reading of the instrument in case if only light beams of small intensity are available, as it often occurs when using portable instruments or the like.

It is a further object of my invention to obtain visible indication of the instrument reading also if only daylight is used as light source.

In accordance with the objects set forth above it is a further object of my invention to provide for in a measuring instrument a light source, a movable indicating element, a stationary optical system having substantially the optical properties of a concave reflecting surface, and a movable optical system connected with the indicating element and adapted to form an image of the light source on the stationary optical system.

A preferred embodiment of my invention consists in providing the movable and stationary optical systems with concave mirrors: the movable concave mirror forms an image of the light source on the stationary concave mirror, and this stationary mirror in turn forms an image of the movable mirror substantially in one point, in which the observer's eye may be located. By placing and shaping the stationary mirror in such a way that it collects all light coming from the movable mirror and that it forms an image of this mirror into the observer's eye, wasting scattering of light will be avoided. In such a way all light reflected from any place of the stationary mirror reaches the eye independently from the reflection factors of the movable mirror.

It is clear that instead of two mirrors alone any combinations of mirrors, lenses and/or prisms or other optical means might be used, as long as at least two different optical systems might be distinguished, one at least partially connected with the moving system of the instrument and forming an image of a light source in the second system, the position of this image indicating the quantity to be measured, and the second one forming an image of the first system into the observer's eye, thus collecting all light coming from the first system. Additional optical systems might be used, e. g. condenser-lenses in connection with the light source, a magnifying system between the eye and the second mirror or its substitute, or between the described two main systems, e. g. deflecting the light beams in a suitable way.

I have further found that measuring instruments of the type described, using high polished reflecting surfaces in the stationary optical system, form a very sharp image of the movable mirror in the eye of the observer. Therefore a small movement of the observer's eye from the place of this sharp image will effect, that its pupil is no more coincident with this image and so in this case no light can hit the eye and no reading is possible.

Even if the position of the eye is fixed by the construction of the instrument, a thorough and therefore costly adjustment of the stationary optical system is necessary. In order to further improve my new measuring instrument I propose to use in the stationary optical system a reflecting surface having a small diffuse reflection. This may be achieved by providing a "rough" reflecting surface e. g. by using a proper electrolyte for electroplating, etching of the surface with acid or similar substances, sand blasting, use of aluminum-bronze-paint or any other suitable method which produces surfaces having both specular and diffuse reflection.

Although no sharp image of the movable mirror may be achieved and the apparent brightness of the indication is decreased, an unsharp image is visible within a much greater angle than a sharp image; at any point within this unsharp image there is enough light to make the indicaton on the stationary optical system clearly visible.

By selecting the proper degree of "roughness" of the mirror surface the best compromise between loss of light through spreading of the reflected light beam and simplification of the mirror adjustment may be found.

The manner in which the objects set forth are attained and in which indicating means of the type proposed may be incorporated in galvanometers for the measurement of very small currents e. g. in an exposure meter for the measurement of very small light values, is shown in the following detailed description and accompanying drawing to which reference will now be made.

In the drawing:

Figure 1 is a schematic diagram of a galvanometer and

Figure 2 a photographic camera including an exposure meter, both instruments equipped with indicating means in accordance with my present invention.

Referring now to the drawing numeral 1 indicates a light source, 2 an opaque mark on said light source, and 3 indicates a concave galvanometer mirror mounted and operated in a way not shown, but known per se. This movable mirror forms an image of said mark 2 on a reading member 4. This reading member consists of a concave mirror with a reflecting surface, which may be either highly polished or having some diffuse reflection. A scale 5 is etched on this reflecting surface.

The image of mark 2 cast upon this concave reading member 4 will move substantially along the scale 5 in accordance with the position of the deflecting concave mirror 3 of the galvanometer. This image, indicating the position of the galvanometer mirror 3, and thereby giving a reading of the galvanometer itself, may be seen by the observer's eye 6, from that point in which the stationary mirror 4 forms an image of the galvanometer mirror 3.

I want to point out that, as set forth above, this concave reading mirror 4 may be replaced by any optical system having substantially the same optical properties as this mirror: Thus it is possible to use instead of this mirror a stationary optical system including a plano-convex lens exposed to the light reflected by the movable mirror 3, and a plane mirror behind the plane face of this lens; it is also possible to use instead of this lens and mirror combination a single plano-convex lens, the plane face of this lens being made light reflecting e. g. being covered with light reflecting material. It is also possible to use as stationary optical system a lens having two convex faces or an adequate lens system; in this case the point in which the image of the movable mirror is formed lies behind, i. e. on the other side of said lens and the eye of the observer must be positioned at this point.

Figure 2 shows a camera illustrating my invention. Inside of the camera casing 7 an exposure meter comprising a galvanometer is shown. This galvanometer consists of a horseshoe type magnet 8, a coil 9 adjacent the pole pieces of this magnet, which coil is turnable in response to the measurement of light intensity. This coil may be supported in the usual way by thin wires connected to the moving coil. These wires thus constitute a support for the coil 9 and tend to hold it in its normal position and to resist turning of the coil under the influence of the light intensity i. e. current being measured; the supporting wires thereby constitute torsion springs for supporting the coil in a predetermined position.

The current to be measured, generated by a not shown photoelectric cell may be suitably applied to coil 9; the flowing current will influence the coil 9 and mirror 10, rigidly connected to the coil, and cause them to turn.

At the upper front edge of casing 7 a translucent, cylindrical glass piece adapted to collect the light outside of the casing is inserted in the wall of the casing forming the light source for the galvanometer mirror 10. An opaque longitudinal mark 12 is provided on said cylindrical glass piece 11, this mark being preferably arranged parallel to the axis of turning of coil 9 and mirror 10. Mirror 10 forms the image of mark 12 on the concave reading mirror 13 in such a way as to enable observation when looking through the rear lens 14 of the lens system 14, 15 of the view finder. Thus the rear view finder lens 14 serves in the same time as magnifying glass giving a greater image of the indicating mark on the reading mirror 13, and to reduce the distance between the observer's eye 6 and the reading mirror 13. Thus the observer controls at the same time the field of view and the correctness of exposure. In case the exposure meter system is not combined with the view finder, special viewing means may be provided for enabling observation of the galvanometer reading on the stationary reading member 13.

Although the invention has been only illustrated as applied to galvanometers and to photographic or cinematographic cameras with built-in exposure meters, it will be understood that the indicating arrangement and the new light source proposed by me may be used for numerous other purposes: It may be of advantage to use these arrangements in connection with different viewing means as telescopes, field glasses, microscopes or the like; it may also prove very useful in connection with different meteorological, astronomical, geodetic and similar other instruments in which the movement, especially rotation or turning, of an indicating element is to be observed.

It must also be stressed that numerous modifications and adaptations of the arrangements proposed by me could be made without departing from the scope of the invention which is to be limited only by the scope of the appended claims.

What I claim is:

1. A galvanometer comprising a stationary reading member including a light converging optical system and having a reading surface provided with at least one fiducial mark, a stationary indicating mark, a turnable mirror indicator adapted to project the image of said stationary indicating mark on various points of said reading surface, said reading member positioned and shaped in such a manner as to collect all light beams originating at said indicating mark and projected on various points of said reading surface, into substantially one point in which the observer's eye may be located.

2. A galvanometer comprising a stationary concave reading mirror provided with a reading scale on its reflecting surface, a turnable mirror indicator adapted to project the image of an indicating mark on various points of the reflecting surface of said stationary concave reading mirror along said reading scale, said concave reading mirror positioned in such a manner as to collect all light beams originating at said indicating mark and projected on various points of said concave mirror along said reading scale, into one point, in which the observer's eye may be located.

3. A measuring instrument comprising a substantially opaque housing, a transparent wall portion in said housing serving as light source for a light beam entering said housing through said transparent wall portion, a galvanometer provided with a movable mirror indicator being arranged within said housing and said mirror indicator being positioned in the path of said light beam and reflecting it, a stationary reading member comprising an optical system being arranged within said housing in the path of the light beam reflected by said mirror indicator, and being shaped in such a manner as to be adapted to collect all light beams originating at said movable mirror indicator into substantially one observation point outside of said housing, and means in a wall of said housing positioned in the path of the light beam deflected by said stationary optical reading system permitting observation of said optical system from said observation point outside of said housing.

4. A measuring instrument comprising a substantially opaque housing, a transparent wall portion in said housing serving as light source for a light beam entering said housing through said transparent wall portion, an opaque indicating mark in the path of said light beam, a galvanometer provided with a movable mirror indicator being arranged within said housing, and said mirror indicator being positioned in the path of said light beam reflecting thereby said light beam, a stationary reading member being arranged within said housng in the path of the light beam reflected by said mirror indicator and being shaped in such a manner as to collect all light beams originating at the indicating mark and projected on various points of said reading member, into substantially one observation point outside of said housing, and means in a wall of said housing being positioned in the path of the light beam deflected by said reading member in such a manner as to permit observation of said reading member from said observation point outside of said housing.

5. A measuring instrument comprising a stationary reading member including a light converging optical system and having a reading surface provided with at least one fiducial mark, a stationary indicating mark, a turnable light deflecting member adapted to project the image of said stationary indicating mark on various points of the reading surface of said stationary reading member, the location of the projection of said stationary indicating mark thus serving as indication of said measuring instrument, said stationary reading member shaped in such a manner as to collect all light beams originating at said stationary indicating mark and projected on various points of its reading surface into substantially one point in which the observer's eye may be located.

6. A measuring instrument comprising a stationary reading member including a light converging optical system and having a reading surface provided with a reading scale, a stationary indicating light source, a turnable light-deflecting member adapted to project the image of said stationary indicating light source on various points of the reading surface of said stationary reading member along said reading scale, the location of the projection of said stationary indicating mark thus serving as indication of said measuring instrument, said stationary reading member shaped in such a manner as to collect all light beams originating at said stationary indicating light source and projected on various points of its reading surface into substantially one point in which the observer's eye may be located.

7. A measuring instrument comprising as stationary reading member a light converging optical system having substantially the reflecting properties of a concave mirror and having a reading surface provided with at least one fiducial mark, a stationary indicating mark, a turnable light deflecting member adapted to project the image of said stationary indicating mark on various points of the reading surface of said reflecting optical system, the location of the projection of said stationary indicating mark thus serving as indication of said measuring instrument, said optical system thus adapted to collect all light beams originating at said stationary indicating mark and projected on various points of the reading surface of said reflecting optical system into substantially one point in which the observer's eye may be located.

8. A measuring instrument comprising as stationary reading member a light converging optical system having substantially the reflecting properties of a concave mirror having a reflecting surface with slightly diffusing effect, a stationary indicating mark, a turnable light deflecting member adapted to project the image of said stationary indicating mark on various points of said reflecting optical system, the location of the projection of said stationary indicating mark thus serving as indication of said measuring instrument, said optical system thus adapted to collect all light beams originating at said stationary indicating mark and projected on various points of said reflecting optical system into substantially one point in which the observer's eye may be located.

9. A measuring instrument comprising a stationary reading member having a concave light converging reflecting surface provided with at least one fiducial mark, a stationary indicating mark, a turnable light deflecting member adapted to project the image of said stationary indicating mark on various points of the concave reflecting surface of said reading member, said reading member thus adapted to collect all light beams originating at said stationary indicating mark and projected on various points of its concave reflecting surface into substantially one point in which the observer's eye may be located.

10. A measuring instrument comprising a concave reading mirror, a stationary indicating mark, a turnable light deflecting member adapted to project the image of said stationary indicating mark on various points of the reflecting surface of said concave reading mirror, the location of the projection of said stationary indicating mark on said reflecting surface thus serving as indication of said measuring instrument, said concave reading mirror thus being adapted to collect all light beams originating at said stationary indicating mark and projected on various points of its reflecting surface into substantially one point in which the observer's eye may be located.

11. A measuring instrument comprising a concave reading mirror having a reflecting surface with slightly diffusing effect, a stationary indicating light source, a turnable light-deflecting member adapted to project the image of said stationary indicating light source on various points of the reflecting surface of said concave reading mirror, the location of the projection of said stationary indicating mark on said reflecting surface thus serving as indication of said measuring instrument, said concave reading mirror thus adapted to collect all light beams originating at said stationary indicating light source and projected on various points of its reflecting surface into substantially one point in which the observer's eye may be located.

12. In a measuring instrument, according to claim 5, said light converging optical system comprising at least one lens with a convex face.

13. In a measuring instrument, according to claim 5, said light converging optical system, comprising at least one lens with a convex face, said lens positioned with said convex face facing said turnable light-deflecting member.

14. In a measuring instrument, according to claim 7, said light converging optical system comprising at least one plano-convex lens, and a mirror behind said lens, said mirror positioned with the reflecting surface facing said lens.

15. In a measuring instrument, according to claim 7, said light converging optical system comprising at least one plano-convex lens positioned with the convex face of said lens facing said movable indicating member, and a mirror behind said lens, said mirror positioned with the reflecting surface facing the plane face of said lens.

16. In a measuring instrument, according to claim 7, said light converging optical system comprising at least one plano-convex lens, the convex face of said lens facing said turnable light-deflecting member, and the plane lens face being covered with reflecting material.

ULRICH R. FURST.